United States Patent [19]

Brasseur, Jr. et al.

[11] Patent Number: 5,960,587
[45] Date of Patent: Oct. 5, 1999

[54] UMBRELLA PLANTER

[76] Inventors: John J. Brasseur, Jr.; Diane N. Brasseur, both of 1903 Forest Edge Dr., Mishawaka, Ind. 46544

[21] Appl. No.: 08/790,213
[22] Filed: Feb. 1, 1997
[51] Int. Cl.⁶ .................................................. A01G 9/02
[52] U.S. Cl. .............................. 47/86; 47/66.6; 47/66.1
[58] Field of Search .................... 47/65.5, 66.6, 47/86, 71, 66.1, 65.6

[56] References Cited

U.S. PATENT DOCUMENTS

| 3,747,268 | 7/1973 | Linder | 47/67 |
| 4,597,221 | 7/1986 | Adair et al. | 47/66.6 |
| 4,821,454 | 4/1989 | Wilds | 47/66.6 |
| 4,847,741 | 7/1989 | Boettinger | 47/66.1 |

FOREIGN PATENT DOCUMENTS

| 493244 | 7/1992 | European Pat. Off. | 47/66.6 |
| 143393 | 8/1903 | Germany | 47/66.1 |
| 24354 | 12/1897 | United Kingdom | 47/66.1 |
| 2093436 | 9/1982 | United Kingdom | 47/86 |

*Primary Examiner*—Michael J. Carone
*Assistant Examiner*—Joanne C. Downs
*Attorney, Agent, or Firm*—Albert W. Watkins

[57] ABSTRACT

A planter adapted for circling an umbrella pole and resting upon a patio table top includes a large pot divided into two halves of identical geometry, and a drip tray similarly divided into two halves of identical geometry. Features are provided to lock each drip tray half into a corresponding pot half. Additional features allow each pot half to interlock to another, thereby forming a complete planter. The planter halves are separable and may be interchanged with other planter halves of the same geometry.

2 Claims, 2 Drawing Sheets

UMBRELLA PLANTER

BACKGROUND OF THE INVENTION

1. Field of the Invention

This invention pertains generally to flower pots or planters, and more specifically to a pot which mounts around an umbrella pole commonly associated with patio furniture.

2. Description of the Related Art

Outdoor recreation, which may include dining, socializing, sporting events, or simply relaxing and enjoying the great outdoors, is a popular pastime around the globe. Furniture which facilitates the enjoyment of the outdoors is commonly referred to as patio furniture. The patio name is derived, of course, from one common use on an outdoor patio. However, patio furniture is often found at many of the aforementioned outdoor recreational events.

Patio furniture may be used year-round in tropical climates, or disassembled and stored during the winters in the more Arctic regions. Since patio furniture is most beneficial when the furniture creates a pleasing and comfortable environment for people, a great deal of design and development has been directed towards improving aesthetics and comfort.

One of these improvements involves the use of an umbrella. People not accustomed to spending long hours in direct sunlight may wish to take shelter under the umbrella. In addition, direct heat from the sunlight may be avoided, allowing those more sensitive to the heat to still partake in activities or enjoyment of the outdoors. Furthermore, food or beverages placed upon the table will also receive shelter from the sunlight.

Most frequently, these umbrellas are supported upon a base and have a pole mounted into the base and extending up through the center of a table. At the top of the pole the umbrella is attached. There will often be a crank or other device which allows the umbrella to be opened up for shelter or collapsed down into a non-functioning state. While the pole which extends through the table is very functional, it is not particularly aesthetic. In fact, the pole does not at all replace the candles and flower center-pieces used to decorate interior dining tables.

There have been a number of attempts at improving the appearance of common poles. Among these attempts are hanging flower pots and baskets, and streamers or other fabric and plastic decorations. Unfortunately, hanging flower baskets are impractical when associated with patio umbrellas, since the umbrella must be collapsed when not in use. Moreover, the weight of the planter adds unfavorably to the weight of the umbrella and makes the umbrella top heavy. Streamers and similar decorations are not as durable as the furniture, and may be easily destroyed during more severe weather. In some instances, the streamers are also relatively difficult to install.

SUMMARY OF THE INVENTION

A planter adapted for circling a pole and resting upon a surface includes a large pot divided into two halves of identical geometry, and a drip tray similarly divided into two halves of identical geometry. Features are provided to lock each drip tray half into a corresponding pot half. Additional features allow each pot half to interlock to each other, thereby forming a complete planter. The planter may be preferably interlocked about a pole used for an umbrella extending through a patio table.

OBJECTS OF THE INVENTION

A first object of the invention is to provide an apparatus which improves the aesthetic appearance of an umbrella pole. A second object of the invention is to provide a means for easily attaching the apparatus to the pole and removing the apparatus therefrom. Another object of the invention is the provision of a bottom tray associated with the apparatus which serves to collect moisture and other matter which may from time to time drain from the apparatus. Another object of the invention is to be able to construct the apparatus using a minimum of tooling, by providing symmetry of components. Yet a further object of the invention is to provide an apparatus with which a half thereof may be removed, and be replaced by a different half. These and other objects of the invention are achieved in the preferred embodiment described hereinbelow, and may be achieved in other embodiments which will be apparent to one of skill in the art after review of this specification.

DESCRIPTION OF THE PREFERRED EMBODIMENT

Figure 1:
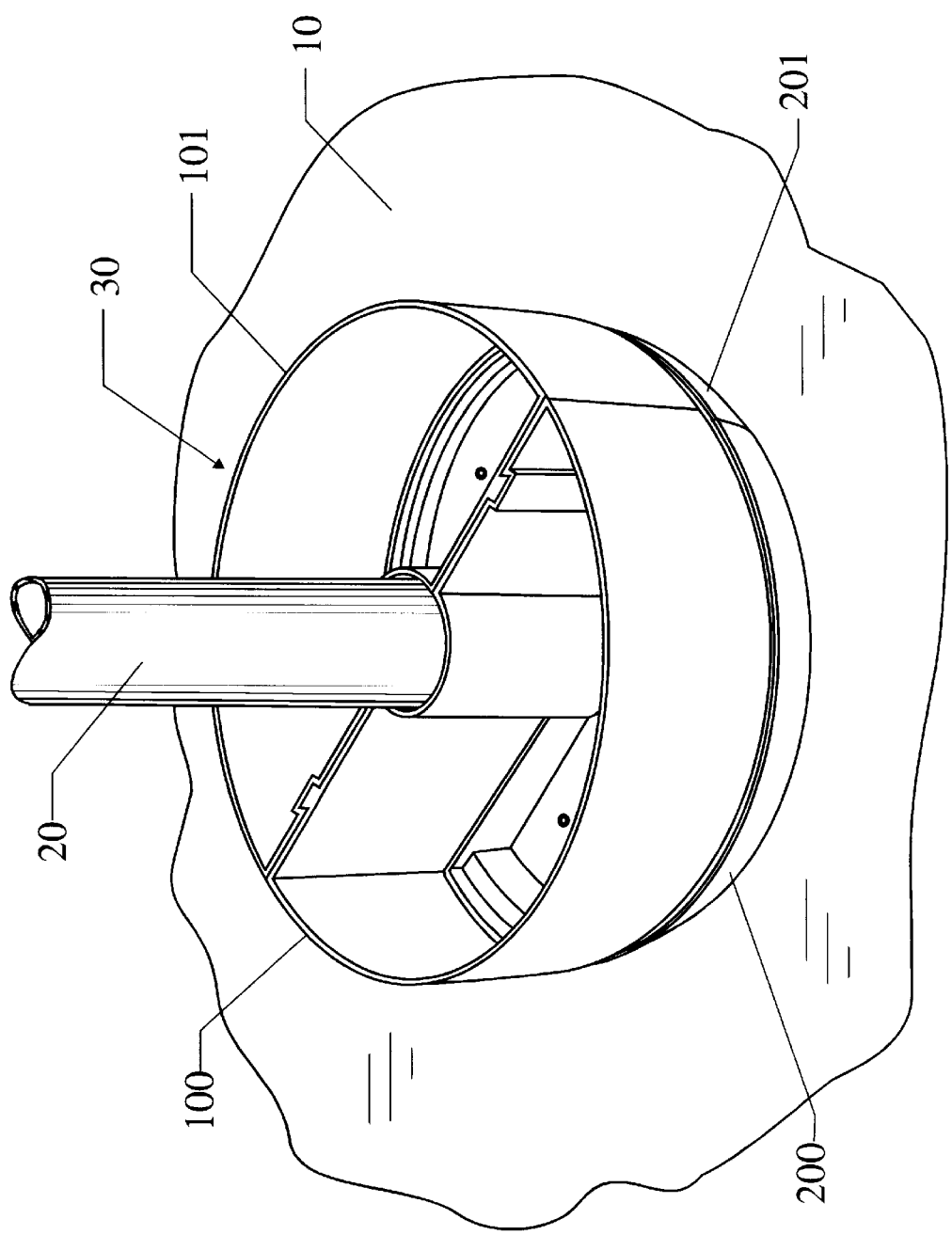
FIG. 1 illustrates the preferred embodiment umbrella planter fully assembled about an umbrella pole and on top of a patio table.

A preferred embodiment umbrella planter 30 is shown fully assembled in FIG. 1 about an umbrella pole 20 on top of a patio table 10. Umbrella planter 30 includes pot half 100, pot half 101, drip tray half 200 and drip tray half 201. Dirt or other plant growth media may be added to pot halves 100, 101 and flowers or other plants grown therein. The weight of planter 30 is carried by patio table 10, thereby allowing some tolerance of fit about umbrella pole 20. Each of the pot halves 100, 101 and the tray halves 200, 201 are preferably formed from molded plastic, and may be manufactured from a variety of polymers and co-polymers which are known to be suitable for outdoor pots and furniture.

Figure 2:
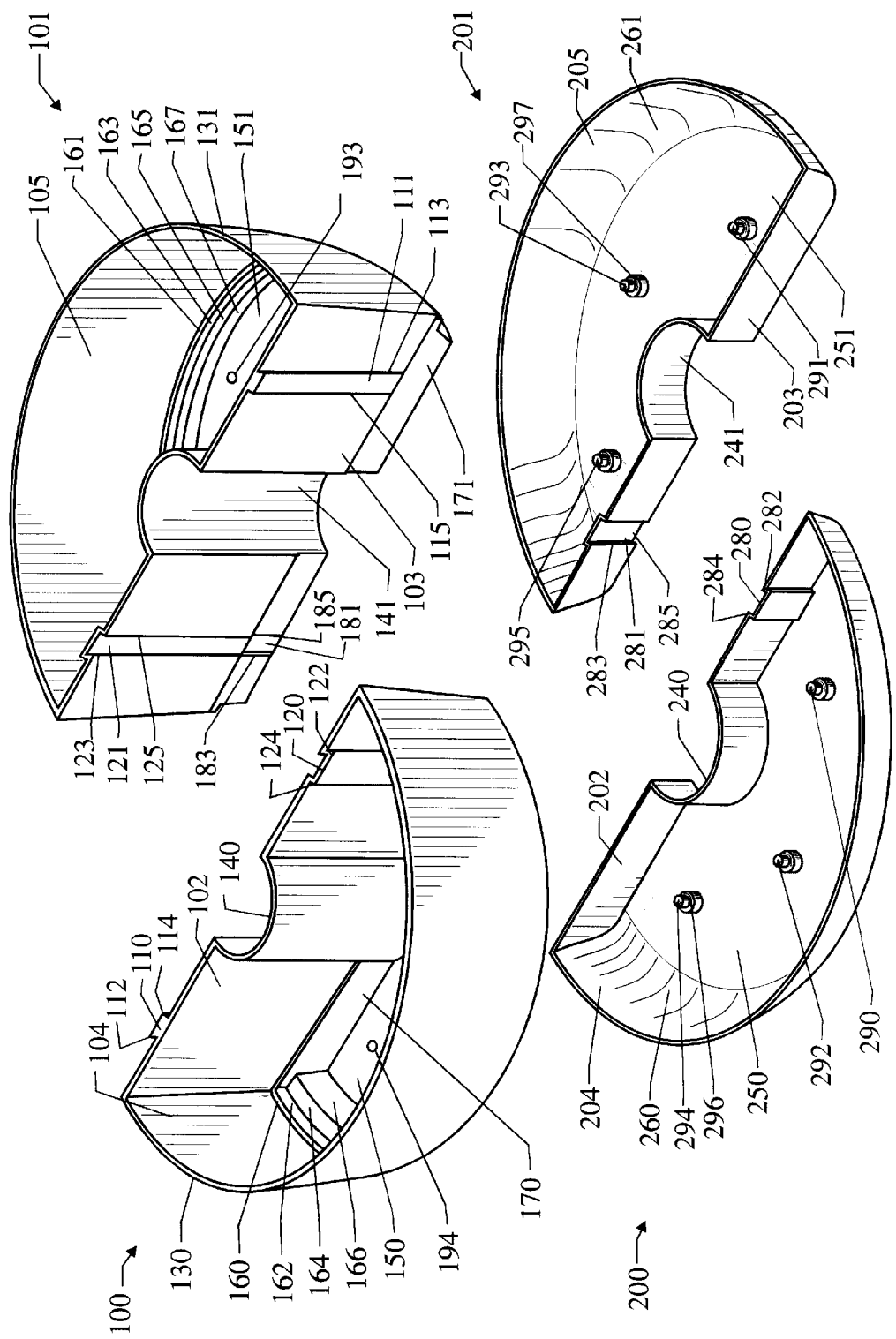
FIG. 2 illustrates the preferred embodiment planter of FIG. 1 by exploded view, thereby exposing various interconnection features.

As will become more apparent after consideration of FIG. 2 and each of the individual components, planter halves 100 and 101 are of identical geometry and so may be formed from a common mold. Similarly, drip tray halves 200, 201 are also of identical geometry and so may also be formed from a common mold. The entire planter 30 requires only two molds, thereby reducing tooling costs to a range typically associated with general use planters not capable of surrounding an umbrella pole. The two molds may be formed as two cavities within a single mold, reducing tooling costs further.

FIG. 2 illustrates the preferred embodiment planter 30 by exploded projected view, without the non-inventive pole 20 and table 10. For reference purposes, the elements of pot half 100 have been numbered with even numbers. Corresponding parts of pot half 101 have been numbered with the next subsequent odd number. As aforementioned, both halves 100 and 101 are formed from a common mold. Drip tray halves 200 and 201 have been similarly referenced, and, in addition, parts of similar function to pot halves 100, 101 have been numbered with similar ones and tens place digits. So, for example, pot half 100 has a vertical wall 102 for retaining dirt and plant matter within pot half 100, and drip tray 200 has a vertical wall 202 for retaining moisture and other leakage from pot half 100 within drip tray 200. Pot half 101 has a corresponding vertical wall 103, and drip tray half 201 has a corresponding vertical wall 203.

Half circle walls 104 and 105 connect with walls 102 and 103 respectively, and thereby complete the vertical walls of pot halves 100, 101. At the tops of walls 104, 105 are rounded edges 130, 131. Edges 130, 131 could, in alternative embodiments, be rolled over, flared, square or take other forms known in the art.

When pot halves 100 and 101 are mated together, they are interlocked and held by several features formed in vertical walls 102 and 103. In particular male half-dovetail 110 is designed to fit within female half-dovetail 121. Male half-dovetail 110 is so named since inside corner 114 is a right angle corner, while dovetail inside corner 112 forms an acute angle as is commonplace with dovetail connections. Yet, since only one dovetail corner 112 is provided, and the other corner 114 is a right angle, only one-half of a dovetail is present in the preferred embodiment. Female half-dovetail 121 also has a corresponding right angle corner 125 and a dovetail corner 123 similar to a dovetail connection angle. Female half-dovetail 121 is slightly larger in dimension between corners 123 and 125 than male half-dovetail 110 is between corners 112 and 114, thereby allowing male half-dovetail 110 to fit within female half-dovetail 121. However, the distance between corner 112 and corner 114 is sufficiently large to ensure that male half-dovetail 110 may not be directly pressed into female half-dovetail 121 along an axis normal (perpendicular) to surface 102. Instead, pot halves 100 and 101 must be slid together with relative motion therebetween occurring along a plane parallel to surface 102. During assembly then, pot halves 100 and 101 will be placed on opposite sides of a pole 20, and at different elevations above table 10. The two pot halves will be brought to the same elevation above table 10, and in the process male half-dovetail 110 will be progressively slid into engagement with female half-dovetail 121. Similarly, male half-dovetail 111 fits within female half-dovetail 120, and will be mated therewith during the same progressive engagement. Dovetail corners 112 and 122 cooperate together to prevent release between pot halves 100 and 101 due to forces normal to walls 102 and 103. Only a vertical displacement of one half with respect to the other off of table 10 will allow their separation. Since large forces normal to wall 102 will not normally be encountered, the use of dovetail angles for both angles 122 and 124, and for both angles 112 and 114 is unnecessary. The cost of dovetail angles is slightly greater, and so in the preferred embodiment only a single dovetail angle is used. Certainly for applications requiring greater retention between halves 100, 101 full dovetails could be used instead of the half-dovetails 110, 111, 120, and 121 illustrated.

While the inner surface of wall 102 adjacent male dovetail 110 is smooth, the inner surface of wall 102 adjacent female dovetail 110 is not, in the preferred embodiment. The inner surface of wall 102 adjacent female dovetail 120 includes only right angles, and could even be rounded.

Also along wall 102 is a half-circle indentation 140, which ultimately surrounds pole 20. While half-circle indentation 140 may take a variety of diameters depending upon the diameter of pole 20, there is no requirement that indentation 140 fit tightly thereagainst. While the preferred embodiment illustrates a relatively tight fit therewith, there may in practice be a much greater space to accommodate a wider range of diameters for pole 20. So enlarging the diameter of indentation 140 will allow a more universal fit with a greater number of umbrella poles. Furthermore, indentation 140 may be square, triangular, or of other shapes to accommodate various shapes of pole 20.

Pot halves 100, 101 include a number of features therein which enable the use of drip tray halves 200, 201. First among these are small holes 194, 193 in the bottom surfaces 150, 151 of halves 100, 101, respectively. Holes 193 and 194 interlock with small protrusions 293 and 294 of trays 201 and 200, respectively. However, larger diameter protrusion base 297 will not pass through hole 193, which thereby keeps bottom surface 151 elevated off of bottom surface 251 of drip tray 201. By so elevating bottom surface 151, there will be a small chamber formed between bottom surface 151 and bottom surface 251 within which excess moisture or other matter may accumulate without overflowing drip tray 201. While additional holes 190, 191, 192, and 195 aren't visible, they are understood to exist in the bases 150 and 151 and to mate with corresponding small protrusions 290, 291, 292, and 295. While the preferred embodiment uses three small protrusions per drip tray and three holes to interlock therewith in the bases of the pot halves 100, 101, it will be appreciated that the number of protrusions and holes is somewhat arbitrary depending upon the precision and cost of the molding dies and the interlock desired for the particular design and size of planter 30. However, at least one interlock between each tray and corresponding pot half is preferred. The interlock allows the drip tray to be handled together with the pot half without separation therebetween, so that a single half may be removed from the table 10 and transported without risk of leakage or loss of the drip tray during a wind or storm. Furthermore, the interlock also includes a protrusion base such as base 296, which serves to provide a repeatable fluid chamber between bottom surface 150 and bottom surface 250.

In addition to the holes 190–195 described above, four additional holes will typically be provided in the bottom surfaces 150, 151. These holes will not mate with any protrusions, but are instead left open to provide fluid drainage into drip trays 200, 201. Other ways to accomplish the necessary drainage are known in the art and contemplated herein, as particular designs may dictate.

Since the outer diameter of wall 204 very closely matches wall 104, there must be a region of reduced size in pot half 100, which is identified as step 160 and wall 162. Step 160 is large enough to accommodate the inner diameter of wall 204 outside of wall 162. An additional step 164 is provided with a sloping wall 166, of yet smaller diameter. Drip tray wall 204 connects to bottom surface 251 through gentle curve 260. The extra space created by step 164 and curve 260 forms a fairly large capacity reservoir for holding fluid between wall 166 and wall 204.

Steps and walls 160–166 accommodate trays 200, 201 around an outer diameter, but do not provide for a mating surface between walls 102 and 103. Yet, when pot halves 100 and 101 are interlocked, walls 202 and 203 will be interfering. To prevent such interference, walls 102 and 103 have a similar step 160, 161 therein, leading to walls 170 and 171, respectively. Walls 170 and 171 are offset from each other sufficiently at the time of pot half interlock as to allow the presence of walls 202 and 203 therebetween. As a result, each pot half 100 and 101 may be considered to be an independent pot structure, yet each half is fully capable of interlocking with another half of identical geometry. The reduced tooling cost benefits associated with this design have already been discussed. In addition to those benefits, it will be understood that where there is a need to switch one half of a pot, such as when disease or infestation strikes only one half of the planter 30, the affected half may easily be removed and quarantined. Furthermore, a decorator may elect a particular combination of pot halves for one occasion, while still having full freedom to readily swap in a different half for a different occasion. Such flexibility may be highly beneficial in a number of situations common to frequent entertainers or organizers of recreational activities.

In order to allow drip trays 200 and 201 to stay associated with their respective pot halves 100, 101 during separation of the two pot halves 100, 101, provision of space must be made for the male half-dovetails 110, 111 that extend normal to walls 102 and 103, respectively. The space comes from rectangular indentation 181 in wall 171 and an identical, though not visible, indentation 180 in wall 170. Indentations 180, 181 have a larger distance between corners 183 and 185, for example, than the distance between corners 123 and 125. This is because male half-dovetail 110 must not only slide through indentation 180, but through a similar indentation 281 in drip tray 201. Since drip tray 201 must fit between indentation 181 and male dovetail 110, indentation 181 must be sized accordingly larger.

Other alternative embodiments have further been contemplated, though not specifically illustrated herein. Examples of changes and alterations in alternative embodiments might include the provision of various decorative designs upon the surfaces of each pot half 100, 101. While in the preferred embodiment walls 104, 105 are illustrated as being perfectly straight, they might in an alternative embodiment be shaped to take on the appearance of a football, baseball, watermelon, caricature, or other such construction. The decorations could then be mixed and matched at will, so long as the novel interlock structure is standardized among each of the decorative designs.

The preferred embodiment planter is specifically conceived of and designed for application with an umbrella pole and patio table. However, the invention is contemplated for use with a variety of poles such as light poles, flag poles, etc., so long as a support is provided under the pot. While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims hereinbelow.

I claim:

1. A planter adapted for containing plant growth media about a pole comprising:

a pot which is non-destructively and repeatably separable into two identical halves, each of said halves which will separately and independently retain said plant growth media;

said two identical pot halves each having a first male interlock feature in the shape of a dovetail protrusion and a first female interlock feature in the shape of a dovetail groove, said first male and female interlock features extending parallel to a longitudinal axis of said pole;

said pot having an opening therethrough through which said pole may pass, but which sufficiently encircles said pole in a plane perpendicular to said pole to prevent removal therefrom along said perpendicular plane;

said first male and female interlock features of complimentary geometry adequate to lock said pot halves against relative movement along a first axis perpendicular to said longitudinal axis while permitting said pot halves to move relative to each other parallel to said longitudinal axis and thereby separate into said two identical halves; and a drip tray which is separable into two identical halves which are not directly interconnectable to each other and which will retain moisture and other matter, wherein said two identical drip tray halves each further include a female groove parallel to said longitudinal axis to allow said pot halves to be separated by passing said first male interlock features of said pot halves through said drip tray female grooves without interference therefrom, said drip tray cooperative with said pot to retain moisture and matter released therefrom.

2. An umbrella planter surrounding a vertical pole and extending longitudinally therewith comprising:

a vertically extending pot separable into two identical sections along a plane intersecting said vertical pole, each section having a first vertically extending groove and a vertically extending protrusion and separately and independently retaining plant growth media;

said first vertically extending groove having features complimentary to said vertically extending protrusion to allow engagement and disengagement therebetween through movement of one section with respect to the other in a vertical direction, said engagement sufficient to prevent separation of said sections when a force perpendicular to said pole is applied to either section;

a drip reservoir formed from two reservoir halves which are not directly interconnectable to each other and which each include retention means to retain said reservoir halves to said pot;

wherein each drip reservoir half further comprises a vertically extending trough through which said vertically extending pot protrusions may pass during said disengagement, to prevent interference therebetween when said pot sections are separated.

* * * * *